(12) United States Patent
Kato et al.

(10) Patent No.: US 9,917,313 B2
(45) Date of Patent: Mar. 13, 2018

(54) APPARATUS USING FUEL GAS

(71) Applicant: HONDA MOTOR CO., LTD., Tokyo (JP)

(72) Inventors: Koichi Kato, Saitama (JP); Koichi Takaku, Saitama (JP); Taneaki Miura, Saitama (JP); Hiroyasu Ozaki, Saitama (JP); Saneto Asano, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/135,038

(22) Filed: Apr. 21, 2016

(65) Prior Publication Data

US 2016/0240873 A1 Aug. 18, 2016

Related U.S. Application Data

(63) Continuation of application No. 13/541,977, filed on Jul. 5, 2012, now abandoned.

(30) Foreign Application Priority Data

Jul. 5, 2011 (JP) .................................. 2011-149337

(51) Int. Cl.
*H01M 8/04* (2016.01)
*H01M 8/04225* (2016.01)
(Continued)

(52) U.S. Cl.
CPC ....... *H01M 8/04225* (2016.02); *B60L 3/0053* (2013.01); *B60L 11/1883* (2013.01);
(Continued)

(58) Field of Classification Search
CPC ............ H01M 8/04225; B60L 11/1887; B60K 15/03; B60K 2015/03203; B60K 2015/03197; F17C 5/06
(Continued)

(56) References Cited

U.S. PATENT DOCUMENTS 4,634,941 A 1/1987 Klimo
5,684,404 A * 11/1997 Millar ................ G01R 31/3648
324/426
(Continued)

FOREIGN PATENT DOCUMENTS

CA 2 780 674 A1 5/2011
CN 101886579 A 11/2010
(Continued)

OTHER PUBLICATIONS

Chinese Office Action application No. 201210229972.9 dated Jun. 30, 2014. No copy provided, per MPEP 609. U.S. Appl. No. 13/541,977.
(Continued)

*Primary Examiner* — Timothy L Maust
*Assistant Examiner* — Andrew Stclair
(74) *Attorney, Agent, or Firm* — Squire Patton Boggs (US) LLP

(57) ABSTRACT

An apparatus using fuel gas is provided, ensuring charge amount of a battery. The apparatus includes battery, fuel gas reservoir unit, fuel lid, open/close detection unit for detecting open/close state of fuel lid, fuel gas condition detection unit for detecting pressure and/or temperature being condition of fuel gas reserved in the fuel gas reservoir unit, communication unit for communication with fuel gas supply device, and control unit for, upon reception of signal notifying that fuel lid is in open state from open/close detection unit, performing dispensing communication to notify the fuel gas supply device, via communication unit, of condition of fuel gas having been input from fuel gas condition detection unit. The control unit stops dispensing communication when control unit has determined, according to signal received from open/close detection unit that predetermined
(Continued)

time has elapsed with the fuel lid remaining in open state after starting dispensing communication.

5 Claims, 10 Drawing Sheets

(51) Int. Cl.

| | | |
|---|---|---|
| *H01M 10/48* | (2006.01) | |
| *H01M 16/00* | (2006.01) | |
| *H01M 8/04082* | (2016.01) | |
| *H01M 8/0432* | (2016.01) | |
| *H01M 8/0438* | (2016.01) | |
| *B60L 3/00* | (2006.01) | |
| *B60L 11/18* | (2006.01) | |
| *H01M 8/04302* | (2016.01) | |
| *H01M 8/04664* | (2016.01) | |
| *B60K 15/03* | (2006.01) | |

(52) U.S. Cl.
CPC ..... *B60L 11/1885* (2013.01); *H01M 8/04201* (2013.01); *H01M 8/04302* (2016.02); *H01M 8/04373* (2013.01); *H01M 8/04425* (2013.01); *H01M 8/04664* (2013.01); *H01M 10/48* (2013.01); *H01M 16/006* (2013.01); *B60K 2015/03315* (2013.01); *Y02T 90/16* (2013.01); *Y02T 90/34* (2013.01); *Y10T 137/8158* (2015.04)

(58) Field of Classification Search
USPC .......... 141/94, 95, 83, 192, 340; 702/63, 64, 702/65; 713/340
See application file for complete search history.

(56) References Cited

U.S. PATENT DOCUMENTS

| | | |
|---|---|---|
| 6,834,688 B2 | 12/2004 | Ono et al. |
| 7,024,321 B1 | 4/2006 | Deninger et al. |
| 7,861,748 B2 | 1/2011 | Iida |
| 7,896,036 B2 | 3/2011 | Kobayashi et al. |
| 8,108,161 B2 | 1/2012 | Tomura et al. |
| 8,214,129 B2 | 7/2012 | Pursifull |
| 8,473,114 B2 | 6/2013 | Bauerle et al. |
| 8,583,305 B2 | 11/2013 | Novak et al. |
| 8,720,500 B2 * | 5/2014 | Maier ............... H01M 8/04201 141/192 |
| 2002/0190133 A1 | 12/2002 | Dedio |
| 2003/0134167 A1 | 7/2003 | Hirakata |
| 2004/0094230 A1 | 5/2004 | Ono et al. |
| 2005/0193989 A1 | 9/2005 | Veenstra |
| 2007/0106438 A1* | 5/2007 | Sasaki ................... B60K 15/00 701/31.4 |
| 2014/0277880 A1 | 9/2014 | Takaku et al. |

FOREIGN PATENT DOCUMENTS

| | | |
|---|---|---|
| DE | 101 25 591 C1 | 5/2002 |
| DE | 103 50 456 B4 | 3/2009 |
| DE | 10 2010 017 920 A1 | 11/2010 |
| JP | 2010-177111 A | 8/2010 |
| JP | 2010-198944 * | 9/2010 |
| JP | 2010-198944 A | 9/2010 |

OTHER PUBLICATIONS

German Search Report file No. 10 2012 211 723.7 dated Oct. 24, 2012. No copy provided, per MPEP 609. U.S. Appl. No. 13/541,977.

* cited by examiner

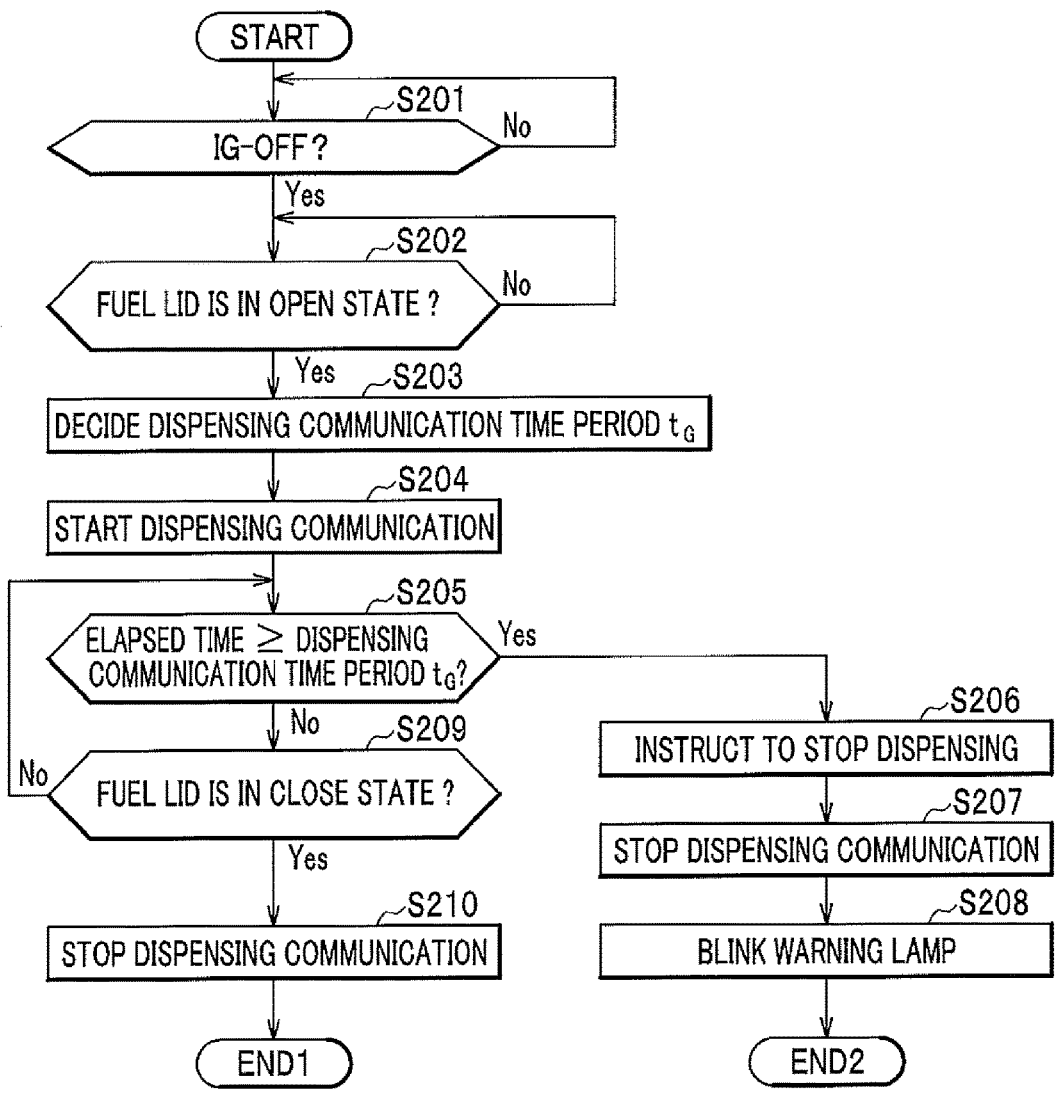

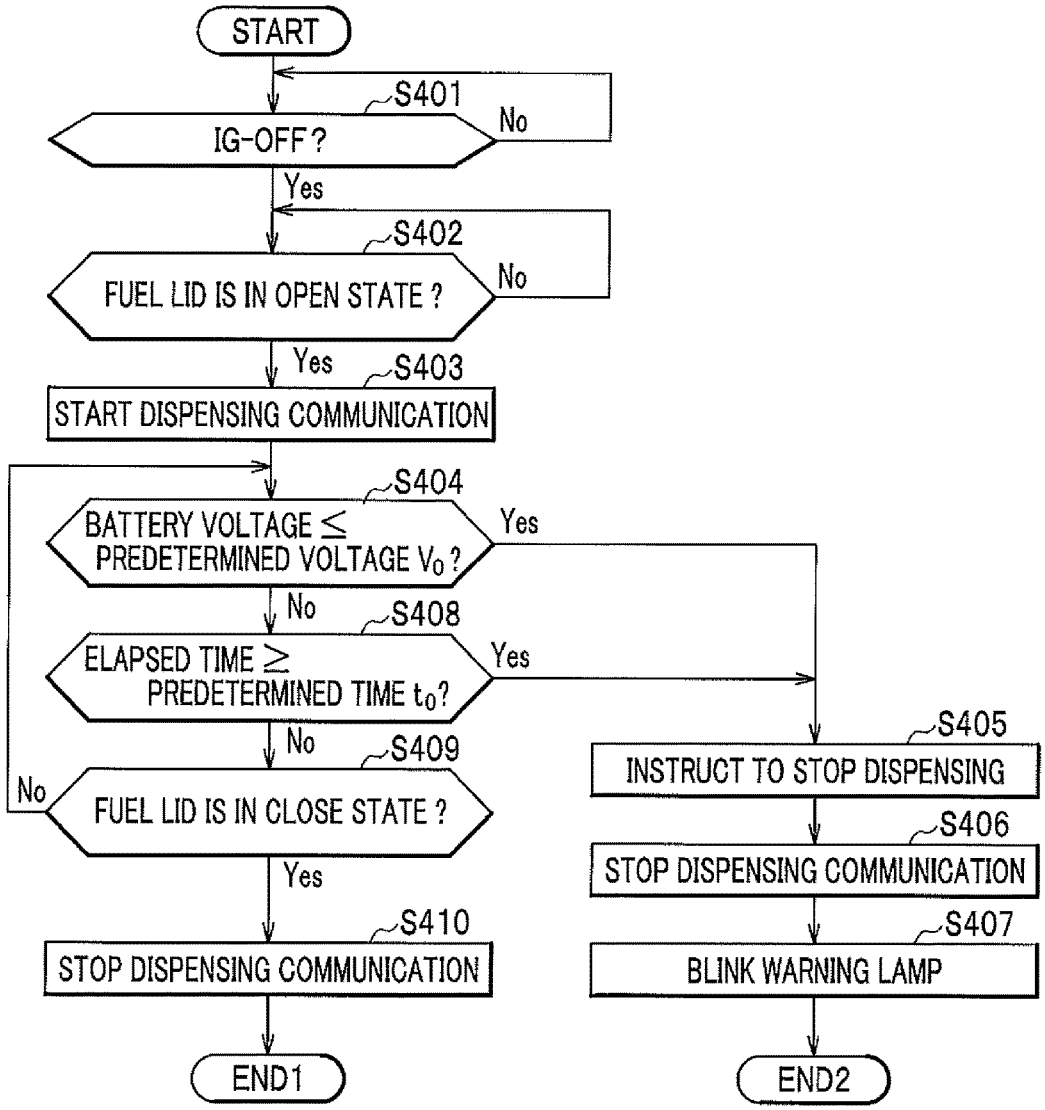

APPARATUS USING FUEL GAS

CROSS REFERENCE TO RELATED APPLICATIONS

This application is a Continuation of co-pending application Ser. No. 13/541,977 filed on Jul. 5, 2012, which claims the priorities of Japanese Application No. 2011-149337, filed on Jul. 5, 2011, the entire specification, claims and drawings of which are incorporated herewith by reference.

BACKGROUND OF THE INVENTION

Field of the Invention

The present invention relates to an apparatus using fuel gas supplied from an external fuel gas supply device.

Description of the Related Art

In recent years, progress has been made on practical use of a fuel cell vehicle to which air including oxygen, which is an oxidant gas, and hydrogen, which is a fuel gas, are supplied, wherein the air and the hydrogen gas cause electrode reaction in a fuel cell to generate electrical power for driving a motor to move the vehicle. A fuel cell vehicle is provided with a hydrogen tank for reserving hydrogen gas and supplying hydrogen to a fuel cell. Further, a meter indicating the remaining amount of hydrogen gas currently reserved in the hydrogen tank is provided beside the driver's seat of the fuel cell vehicle. When the remaining amount of the hydrogen gas reserved in the hydrogen tank has become small as a result of the drive of the fuel cell vehicle, a driver who is aware of this state by a view of the meter drives and moves the fuel cell vehicle to a hydrogen supply station. Then, hydrogen is supplied (dispensed) into the hydrogen tank of the fuel cell vehicle by a hydrogen supply device provided at the hydrogen supply station.

When hydrogen is supplied to the hydrogen tank of the fuel cell vehicle, the fuel cell vehicle performs communication (hereinafter referred to as dispensing communication) with the dispenser of the hydrogen station. That is, the fuel cell vehicle transmits information on the temperature, the pressure, and the like of the hydrogen having been dispensed into the hydrogen tank, and the dispenser adjusts the pressure, the flow rate, the flow speed, and the like in supplying hydrogen, based on the information received from the fuel cell vehicle.

In Patent Document 1 (JP 2010-198944 A), described is a technology by which an infrared communication device is provided at a hydrogen supply inlet (hydrogen dispensing inlet) on a vehicle side, and when a lid (fuel lid) is opened, an ECU (Electric Control Unit) obtains information on the pressure and the temperature of hydrogen in a hydrogen supply pipe and transfers this information to an external hydrogen supply device (dispenser) via the infrared communication device. According to the technology described in Patent Document 1, as a lid switch is unnecessary, it is possible to downsize the lid.

In the technology disclosed by Patent Document 1, the ECU monitors the pressure and the temperature in the hydrogen supply pipe, and when the pressure in the hydrogen supply pipe becomes higher than or equal to a predetermined pressure, the ECU transmits a signal to complete dispensing communication. Accordingly, by the technology described in Patent Document 1, even in a case that the fuel cell vehicle is left for a long time in a state that the lid is opened, the ECU continues to obtain information on the pressure and the temperature of the hydrogen in the hydrogen supply pipe and transmits the information to the external hydrogen supply device via the infrared communication device unless the ECU transmits the signal for completion. Consequently, by the technology described in Patent Document 1, when the fuel cell vehicle is left in a state that the lid is opened, the amount of charge of a battery gradually decreases as time elapses.

Accordingly, by the technology described in Patent Document 1, in case that the fuel cell vehicle is left for a long time in a state that the lid is opened, it is possible that the amount of charge of the battery drops, and the air compressor and the like cannot be operated due to an associated drop in the discharge capacity of the battery when the fuel cell starts operation, which disables starting up of the fuel cell vehicle (in other words, the battery runs out.)

SUMMARY OF THE INVENTION

In this situation, an object of the invention is to provide an apparatus using fuel gas wherein the apparatus ensures the charge amount of a battery thereof.

In order to solve the above-described problem, according to the present invention, an apparatus using fuel gas supplied from an external fuel gas supply device includes: a battery for supplying power to a device/devices of the apparatus; a fuel gas reservoir unit for reserving fuel gas supplied from the fuel gas supply device; a fuel lid for covering a supply inlet to which fuel gas is supplied from the fuel gas supply device; means for detecting an open/close state of the fuel lid; means for detecting fuel gas condition that is a pressure and/or a temperature of fuel gas reserved in the fuel gas reservoir unit; means for performing communication with the fuel gas supply device; and means for, upon reception of a signal notifying that the fuel lid is in an open state from the means for detecting an open/close state, controlling dispensing communication, using power supplied from the battery, in order to notify the condition of the fuel gas having been input from the means for detecting fuel gas condition to the fuel gas supply device via the means for performing communication, wherein the means for controlling stops the dispensing communication when the means for controlling has determined, according to a signal received from the means for detecting an open/close state, that a predetermined time period has elapsed with the fuel lid remaining in the open state after starting the dispensing communication.

Thus, according to the invention, even if the fuel cell vehicle (apparatus using fuel gas) is left for a long time with the fuel lid remaining in the open state, the means for controlling stops dispensing communication when a predetermined time period has elapsed. It is thereby possible to ensure a necessary charge amount (SOC; State Of Charge) of the battery, and prevent running out of the battery which could be caused by performing continuous dispensing communication for a long time.

In another aspect according to the invention, the apparatus using fuel gas further includes: means for detecting a charge state of the battery, wherein, upon reception of a signal notifying that the fuel lid is in the open state from the means for detecting an open/close state, the means for controlling decides the predetermined time period, corresponding to a voltage of the battery detected by the means for detecting a charge state.

Thus, according to the invention, it is possible to decide a dispensing communication time period, corresponding to the voltage of the battery at a time when the fuel lid is opened, and ensure the charge amount (SOC: State Of Charge) of the battery by not performing dispensing communication longer than necessary.

In still another aspect according to the invention, the means for controlling is set such that the higher the voltage of the battery detected by the means for detecting a charge state is, the longer the predetermined time period is.

Thus, according to the invention, dispensing communication can be performed for a maximum limit of time period that is allowed in case the voltage of the battery at a time the fuel lid is opened is taken into account.

In yet another aspect according to the invention, the apparatus further includes: means for detecting a charge state of the battery, wherein the means for controlling stops the dispensing communication when the voltage of the battery detected by the means for detecting a charge state is lower than or equal to a predetermined voltage.

Thus, according to the invention, regardless of a time period in which the fuel lid has been left remaining in the open state, when the voltage of the battery has become lower than or equal to a predetermined value, dispensing communication is immediately stopped. According to the invention, it is thereby possible to ensure a necessary charge amount (SOC: State Of Charge) of the battery.

In still another aspect according to the invention, the means for controlling continues the dispensing communication for a predetermined extension time period, when, according to a signal having been input from the means for detecting fuel gas condition, the means for controlling has determined that fuel gas is currently being supplied to the fuel gas reservoir unit after a reference time point or that fuel gas was supplied to the fuel gas reservoir unit within a predetermined past time after the reference time point, the reference time point being a time point at which the predetermined time period has elapsed with the fuel lid remaining in the open state after starting the dispensing communication.

Thus, according to the invention, even in case that a predetermined time period has elapsed with the fuel lid remaining in the open state, if, for example, fuel gas is currently being supplied from the fuel gas supply device, it is possible to continuously perform dispensing fuel gas while ensuring a necessary charge amount (SOC: State Of Charge) of the battery, by extending dispensing communication for a predetermined time period.

According to the present invention, it is possible to provide an apparatus using fuel gas wherein the apparatus ensures the charge amount of a battery thereof.

BRIEF DESCRIPTION OF THE DRAWINGS

FIG. 4 is a flowchart showing the flow of a process of dispensing communication by the fuel cell vehicle in a second embodiment according to the invention;

FIG. 8 is a flowchart showing the flow of a process of dispensing communication by the fuel cell vehicle in a fourth embodiment according to the invention;

DETAILED DESCRIPTION OF THE PREFERRED EMBODIMENTS

First Embodiment

Figure 1:
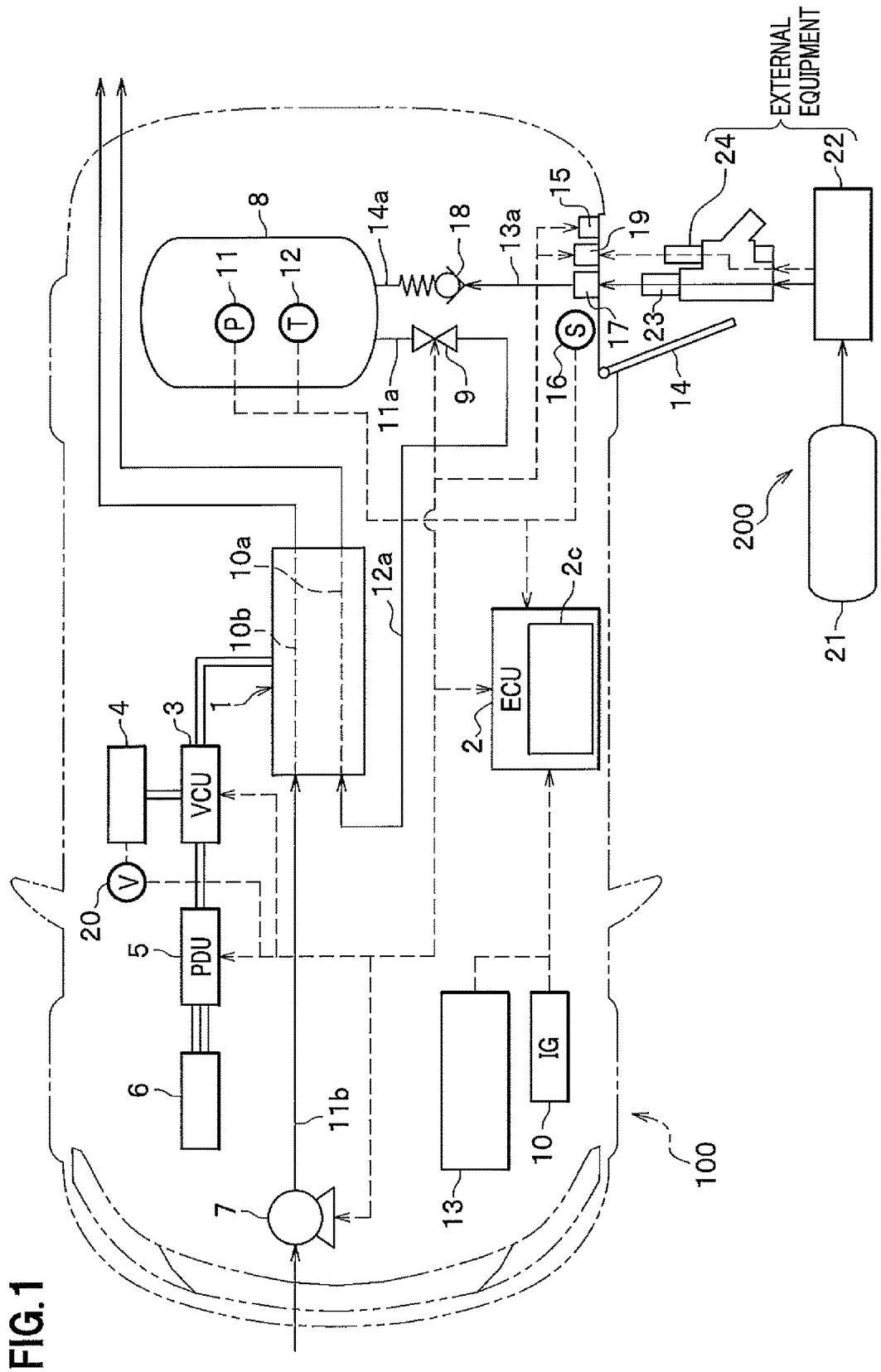
FIG. 1 is a block diagram showing the configuration of a fuel cell vehicle according to the present invention.

A first embodiment according to the present invention will be described below, referring to the drawings, as appropriate. The same symbol will be assigned to an element common to respective drawings, and overlapping description will be omitted.

Configuration of Fuel Cell Vehicle

FIG. 1 is a block diagram showing the configuration of a fuel cell vehicle according to the present invention. The fuel cell vehicle 100 includes a fuel cell 1, an ECU 2, a VCU (chopper) 3, a battery 4, a PDU (inverter) 5, a motor 6, a compressor 7, a hydrogen tank 8, a shutoff valve 9, an IG (ignition) 10, a fuel lid opener switch 13, a fuel lid 14, a fuel lid opener 15, a hydrogen dispensing inlet 17, a check valve 18, an interface 19, various sensors, and various pipes.

Herein, in FIG. 1, a solid arrow represents the flow of air including oxygen (oxidant gas) or hydrogen (fuel gas). A triple solid line represents a three phase alternate current. A double solid line represents a direct current. A dashed line represents an electrical signal for transmitting certain information.

The fuel cell 1 is arranged as follows. That is, when the fuel cell 1 is provided with hydrogen (fuel gas) through an anode flow path 10a, electrode reaction represented by Expression 1 occurs. When the fuel cell 1 is provided with air including oxygen (oxidant gas) through a cathode flow path 10b, electrode reaction represented by Expression 2 occurs to generate a potential difference (OCV (Open Circuit Voltage)) in each unit cell.

$$2H_2 \rightarrow 4H^+ + 4e^- \qquad \text{Expression 1}$$

$$O_2 + 4H^+ + 4e^- \rightarrow 2H_2O \qquad \text{Expression 2}$$

The ECU 2 is a control unit for electronic control of the fuel cell vehicle 100, and includes an electronic circuit (not shown) with a CPU, a ROM, a RAM, various interfaces, and the like. The ECU 2 controls various units, according to programs stored therein, to execute various processes. Further, the ECU 2 is provided with power from the battery 4 through the later-described VCU 3, as necessary.

The ECU 2 includes a dispensing communication control section 2c. In dispensing hydrogen to the hydrogen tank 8, the dispensing communication control section 2c performs various control processes for dispensing communication with the dispenser (hydrogen dispensing unit) 22 of an external hydrogen station 200.

Concretely, the dispensing communication control section 2c stores the hydrogen pressure, the hydrogen temperature, and the like inside the hydrogen tank 8 obtained from a pressure sensor 11 and/or a temperature sensor 12, which will be described later, in the storage section, not shown, of the ECU 2. In performing dispensing communication with the dispenser 22 of an external hydrogen station 200, the dispensing communication control section 2c reads out the above-described information from the storage section (not shown) and transmits the information to the dispenser 22 via the interface 19 and a communication connecter 24. Further, the dispensing communication control section 2c stores information on the hydrogen pressure, the hydrogen temperature, and the like inside the hydrogen tank 8 in the storage section (not shown), and updates the information at certain time intervals.

Herein, the control unit of the fuel cell vehicle is not limited to the ECU2, and may be a control unit that is provided with a mechanical transmission mechanism instead of an electrical unit.

Information transmitted from the dispensing communication control section 2c to the dispenser 22 includes, in addition to the hydrogen pressure and the hydrogen temperature inside the hydrogen tank 8, described above, the material (aluminum alloy, resin, etc.) of the hydrogen tank 8, the allowable temperature and the allowable pressure of the hydrogen tank 8 depending on the material, the expiration date for use of the hydrogen tank 8, the number of times of dispensing hydrogen, and the like. Information transmitted by the dispensing communication control section 2c to the dispenser 22 in such a manner will be hereinafter referred to as dispensing communication information. The dispensing communication information is stored in the storage section (not shown) of the ECU 2, and when the ECU 2 performs dispensing communication, the dispensing communication control section 2c reads out the dispensing communication information from the storage section (not shown) and transmits the information to the dispenser 22.

Further, the dispensing communication control section 2c starts dispensing communication, with a signal notifying that the fuel lid 14 has become into an open state (lock release) as a trigger by a later-described fuel lid open/close sensor 16, and transmits the above-described various information to outside via the interface 19.

Still further, the dispensing communication control section 2c also has a function to obtain the voltage of the battery 4 detected by a voltage sensor 20 and monitor the voltage.

Upon instruction from the ECU 2, the VCU (Voltage Control Unit) 3 controls the output current and the output voltage of the fuel cell 1 and controls charging/discharging of the battery 4. The battery 4 is provided with, for example, a plurality of lithium-ion secondary batteries. The battery 4 is charged with an excessive voltage of the fuel cell 1 or a regenerated power from the motor 6, or assists (compensates) a power shortage of the fuel cell 1. The PDU (Power Drive Unit) 5 is an inverter that, upon instruction from the ECU 2, converts a direct current that is input from the VCU 3 into a three-phase alternate current and supplies the current to the motor 6. With a power from the fuel cell 1 and/or the battery 4, the motor 6 generates drive force for driving the fuel cell vehicle 100.

Upon instruction by the ECU 2, the compressor 7 operates to take in air including oxygen and supply the air to the cathode flow path 10b through a pipe 11b. The hydrogen tank 8 is connected to the inlet of the anode flow path 10a through a pipe 11a, the shutoff valve 9, and a pipe 12a. When the shutoff valve 9 is opened by an instruction from the ECU 2 to open the shutoff valve 9, hydrogen is supplied from the hydrogen tank 8 through the shutoff valve 9 and the like to the anode flow path 10a. The ECU 2 is set such as to open the shutoff valve 9, upon detection of ON signal of the IG 10, in order to supply hydrogen to the anode flow path 10a so that the fuel cell 1 generates power.

The shutoff valve 9 is connected through the pipe 12a to the anode flow path 10a, and adjusts the supply of hydrogen from the hydrogen tank 8 through the pipe 11a by opening and closing, according to an instruction from the ECU 2. The IG 10 is a start-up switch of the fuel cell vehicle 100 and is provided beside the driver's seat. The ECU 2 is connected with the IG 10 to detect an ON/OFF signal of the IG 10.

As a known method is used by the ECU 2 to control power generation by the fuel cell 1, detailed description of the control will be omitted.

The pressure sensor 11 is a sensor for detecting the hydrogen pressure inside the hydrogen tank 8, and is arranged inside the hydrogen tank 8. The pressure sensor 11 outputs the detected hydrogen pressure inside the hydrogen tank 8 to the ECU 2.

The temperature sensor 12 is a sensor for detecting the hydrogen temperature inside the hydrogen tank 8, and is arranged in the hydrogen tank 8. The temperature sensor 12 outputs the hydrogen temperature inside the hydrogen tank 8 to the ECU 2.

The positions of the pressure sensor 11 and the temperature sensor 12 may be changed, as appropriate.

The fuel lid opener switch 13 is a switch for opening the fuel lid 14, and is provided beside the driver's seat. The ECU 2 is connected with the fuel lid opener switch 13, and when the fuel lid opener switch 13 is pressed down, the ECU 2 detects a signal from the fuel lid opener switch 13.

The fuel lid 14 is a lid that is rotationally opened when hydrogen is to be dispensed, and is provided at a side of the fuel cell vehicle 100. The fuel lid 14 normally (in other words, when hydrogen is not dispensed) covers the hydrogen dispensing inlet 17 and is locked in a close state. On the other hand, when a driver presses down the fuel lid opener switch 13 for dispensing hydrogen and the later-described fuel lid opener 15 thereby receives an instruction from the ECU 2 to open the fuel lid 14, the fuel lid 14 is rotated in the opening direction (lock release) to become into an open state.

According to an instruction from the ECU 2, the fuel lid opener 15 performs locking or lock releasing of the fuel lid 14 as described above. The method of transmitting an instruction, to open the fuel lid 14, to the fuel lid opener 15 is not limited to the above-described electrical method. For example, a mechanical transmitting method in which the fuel lid opener 15 and a leasing lever (not shown) are connected by a wire cable (not shown) may be employed.

The fuel lid open/close sensor 16 is a sensor for detecting the open/close state of the fuel lid 14, and is provided in the vicinity of the fuel lid 14. The fuel lid open/close sensor 16 outputs a signal corresponding to the open/close state of the fuel lid 14 to the ECU 2.

As described above, when the ECU 2 has received a signal notifying that the fuel lid 14 has become into the open state (lock release) from the fuel lid open/close sensor 16, the ECU 2 starts up the dispensing communication control section 2c to start dispensing communication with the external hydrogen station 200, and transmits dispensing communication information.

The hydrogen dispensing inlet 17 is a part to which the hydrogen dispensing nozzle 23 of the external hydrogen station 200 is connected when hydrogen is to be dispensed into the hydrogen tank 8, and is provided at a side face of the vehicle.

The check valve 18 has a valve structure that restricts the flow of hydrogen supplied through the hydrogen dispensing inlet 17 so that the hydrogen flows in one direction toward the hydrogen tank 8. Further, in dispensing hydrogen, the check valve 18 opens when hydrogen is supplied at a certain supply pressure through the hydrogen dispensing inlet 17 and the pipe 13a, and the check valve 18 thereby dispenses hydrogen into the hydrogen tank 8 through the pipe 14a.

The interface 19 is a part to which the communication connecter 24 of the external hydrogen station 200 is connected during dispensing hydrogen, and the interface 19 is provided in the vicinity of the hydrogen dispensing inlet 17. The voltage sensor 20 is connected to the battery 4, and detects the voltage of the battery 4 and outputs the voltage to the ECU 2.

The hydrogen station 200 that supplies hydrogen, which is a fuel gas, to the fuel cell vehicle 100 will be briefly described below.

The hydrogen station 200 includes a hydrogen reserving tank 21, the dispenser 22, the hydrogen dispensing nozzle 23, and the communication connecter 24. The hydrogen reserving tank 21 reserves hydrogen, which is to be supplied to the fuel cell vehicle 100, at a high temperature. The dispenser (hydrogen dispensing device) 22 is connected with the hydrogen reserving tank 21, controls start/stop of dispensing hydrogen to be supplied to the hydrogen tank 8 of the fuel cell vehicle 100, and controls the pressure, the fuel rate, and the like in dispensing hydrogen. Further, in dispensing hydrogen into the hydrogen tank 8 of the fuel cell vehicle 100, the dispenser 22 performs dispensing communication with the dispensing communication control section 2c of the ECU 2 via the interface 19 and the later-described communication connecter 24. Through the dispensing communication, the dispenser 22 obtains information on the hydrogen pressure, the hydrogen temperature, and the like inside the hydrogen tank 8, and adjusts, based on the information, the pressure and the like of hydrogen supplied from the hydrogen reserving tank 21. In such a manner, the dispenser 22 dispenses hydrogen into the hydrogen tank 8 of the fuel cell vehicle 100.

The hydrogen dispensing nozzle 23 is connected with the hydrogen reserving tank 21 through the dispenser 22, and is inserted into the hydrogen dispensing inlet 17 in dispensing hydrogen into the hydrogen tank 8 of the fuel cell vehicle 100. Then, the hydrogen supplied from the hydrogen reserving tank 21 of the hydrogen station 200 is adjusted with respect to the pressure and the like by the dispenser 22, and dispensed into the hydrogen tank 8 through the hydrogen dispensing nozzle 23, the hydrogen dispensing inlet 17, the pipe 13a, the check valve 18, and the pipe 14a. The communication connecter 24 is a tool for connecting wires and is connected with the dispenser 22. The communication connecter 24 is inserted into the interface 19 when hydrogen is dispensed into the hydrogen tank 8 of the fuel cell vehicle 100.

Operation of Fuel Cell Vehicle in First Embodiment

Figure 2:
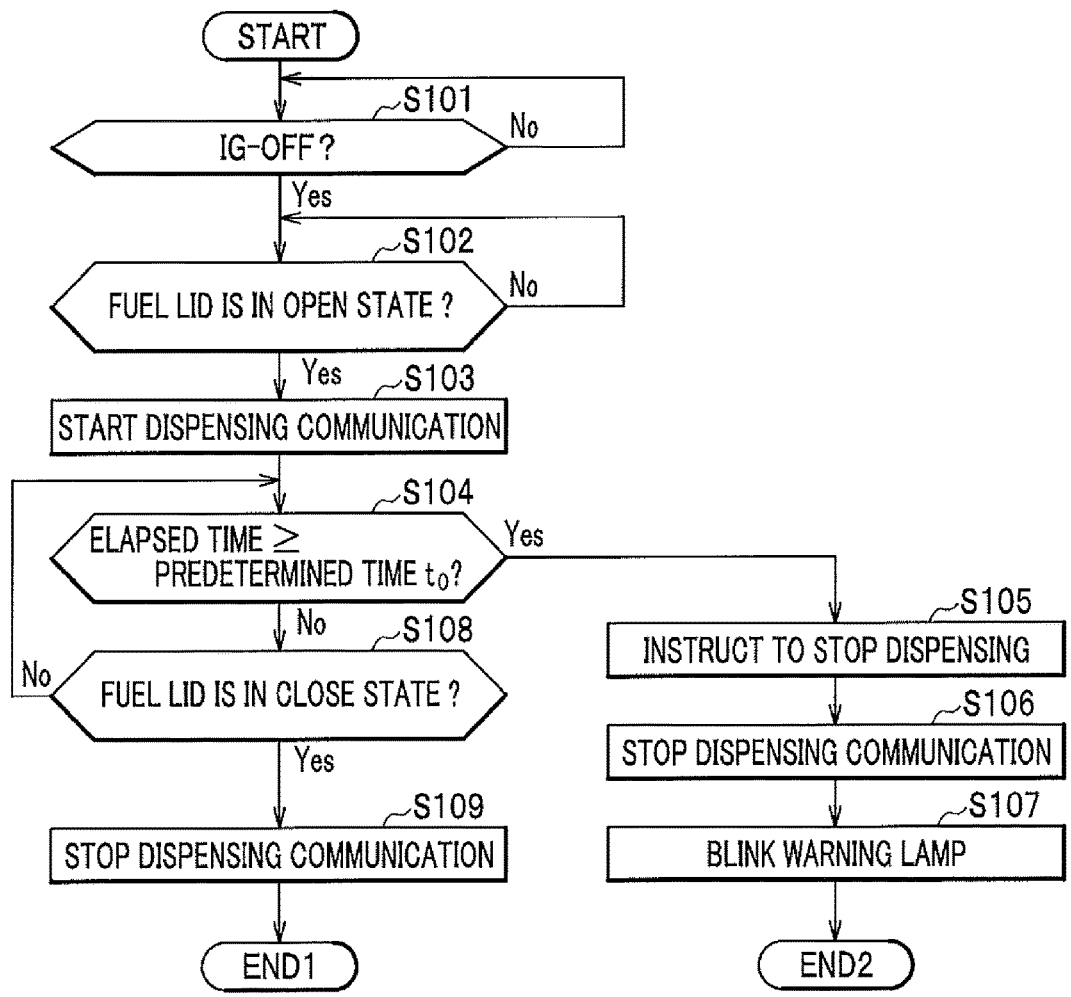
FIG. 2 is a flowchart showing the flow of a process of dispensing communication by the fuel cell vehicle in a first embodiment according to the invention.

FIG. 2 is a flowchart showing the flow of the process of dispensing communication by the fuel cell vehicle in the present embodiment. As described above, the dispensing communication control section 2c of the ECU 2 starts dispensing communication when a signal notifying that the fuel lid 14 has become into the open state is input from the fuel lid open/close sensor 16. Accordingly, a series of processes related to the dispensing communication that starts when the fuel lid 14 has become into the open state is assumed to be performed by the dispensing communication control section 2c of the ECU 2 in the following description.

In step S101 in FIG. 2, the ECU 2 determines whether or not the IG 10 is in OFF state. If the IG 10 is in OFF state (step S101→Yes), then the process by the ECU 2 proceeds to step S102. If the IG 10 is in ON state (step S101→No), then the ECU 2 repeats the determination in step S101.

In step S102, the ECU 2 determines whether or not the fuel lid 14 is in the open state. If the fuel lid 14 is in the open state (step S102→Yes), the process by the ECU 2 proceeds to step S103. If the fuel lid 14 is in the close state (step S102→No), then the ECU 2 repeats the determination in step S102.

In step S103, the ECU 2 starts dispensing communication. That is, the ECU 2 reads out, from the storage section not shown, dispensing communication information including the hydrogen pressure and/or the hydrogen temperature inside the hydrogen tank 8, and transmits the dispensing communication information via the interface 19.

Next, in step S104, the ECU 2 determines whether or not the elapsed time after a start of the dispensing communication is longer than or equal to a predetermined time period $t_0$. Herein, the predetermined time period to is a preset value (for example, 60 min).

Figure 3:
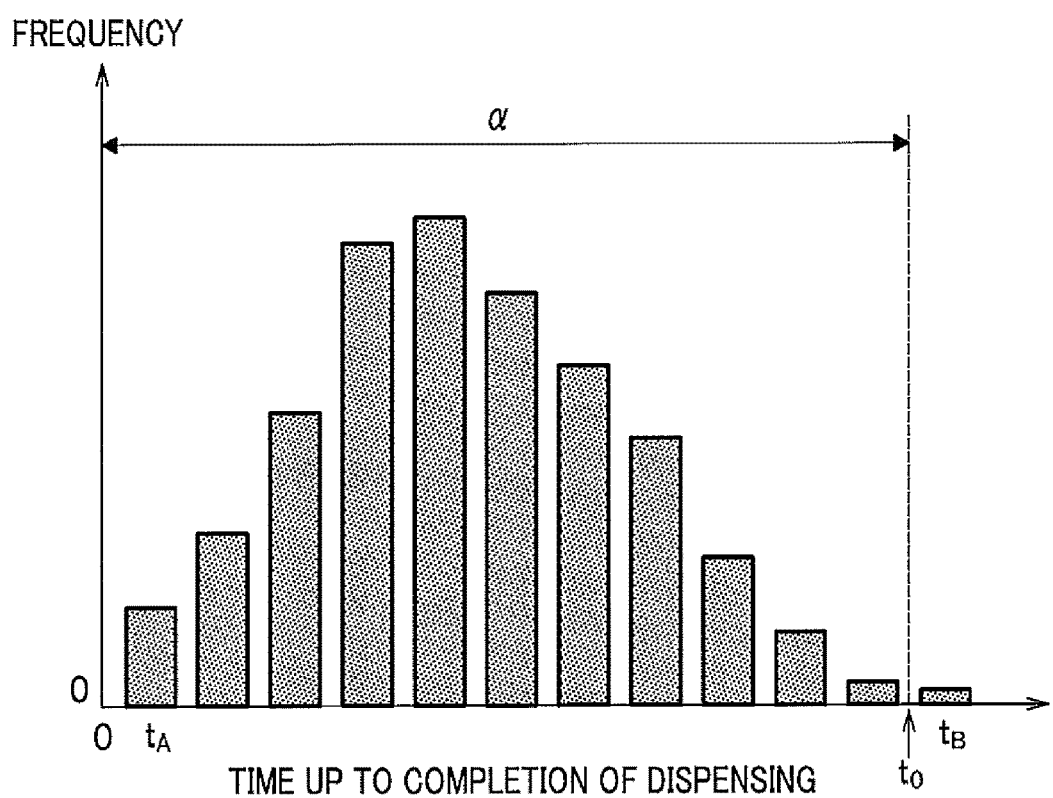
FIG. 3 is a diagram showing the time periods up to completion of dispensing hydrogen into the hydrogen tank of the fuel cell vehicle and the frequencies of the respective time periods.

FIG. 3 is a diagram showing the time periods up to completion of dispensing hydrogen into the hydrogen tank of the fuel cell vehicle and the frequencies of the respective time periods. The value of the remaining amount of hydrogen in the hydrogen tank 8 immediately before the supply of hydrogen to the fuel cell vehicle 100 varies depending on cases. For example, even in a state that hydrogen is sufficiently dispensed in the hydrogen tank 8, hydrogen may be supplied from the hydrogen station 200, according to determination by a driver. In this case, dispensing of hydrogen is completed in a comparatively short time (for example, time period $t_A$: refer to FIG. 3). On the other hand, in a state that the hydrogen tank 8 is almost empty with little hydrogen, it takes a comparatively long time (for example, $t_B$: refer to FIG. 3) to complete dispensing of hydrogen.

Statistical data, as Shown in FIG. 3, is obtained in advance, and the above-described predetermined time period $t_0$ (refer to FIG. 3) is set such as to cover most frequencies (for example, higher than or equal to 99%: refer to the range α in FIG. 3). The predetermined time period $t_0$ is stored in the storage section, not shown, of the ECU 2.

Returning to FIG. 2, in step S104, if it is determined that the predetermined time period $t_0$ has elapsed after a start of dispensing communication (step S104 Yes), the ECU 2 instructs the dispenser 22 to stop dispensing hydrogen. That is, the ECU 2 transmits a signal to the dispenser 22 via the interface 19 and the communication connecter 24 to stop dispensing of hydrogen.

In step S105, it is also possible that the fuel cell vehicle 100 is left at a place (for example, in a parking area) other than the hydrogen station 200 in a state, for example, that the fuel lid 14 is left open by mistake. Even in such a case, in other words, regardless of whether or not the hydrogen dispensing nozzle 23 is inserted in the hydrogen dispensing inlet 17, the ECU 2 is assumed to transmit to the interface 19 an instruction to stop dispensing. Incidentally, the instruction to stop dispensing only requires outputting a predetermined signal. Accordingly, transmitting in itself from the ECU 2 the instruction to stop dispensing affects the charged amount of the battery 4 little.

Then, in step S106, the ECU 2 stops dispensing communication. After stopping dispensing communication, the ECU 2 stops supplying current to the pressure sensor 11 and the temperature sensor 12, and also stops obtaining the pressure and temperature in the hydrogen tank 8.

In step S107, the ECU 2 blinks a warning lamp (not shown). The warning lamp is provided at a position where a driver at the driver's seat can view the warning lamp. The ECU 2 blinks the warning lamp to notify the driver that the fuel lid 14 is left open.

Herein, though not shown, as a power from the battery 4 is also required for blinking the warning lamp, setting is preferably made in the storage section, not shown, of the ECU 2 such as to blink the warning lamp only for a predetermined time period. In this case, when the predetermined time period has elapsed after starting blinking of the warning lamp, the ECU 2 stops blinking of the warning lamp. Also in the later-described other embodiments, the same thing can be said about the blinking time period of a warning lamp.

Further, the ECU 2 may notify the driver that the fuel lid 14 is left open, by sound together with blinking of the warning lamp.

In step S104, if it is determined that the predetermined time period has not yet elapsed after starting dispensing communication (step S104→No), the process by the ECU 2 proceeds to step S108. In step S108, the ECU 2 determines whether or not the fuel lid 14 is in the close state. In step S108, if the fuel lid 14 is in the close state (step S108 Yes), the process by the ECU 2 proceeds to step S109. If the fuel lid 14 is in the open state (step S108→No), the process by the ECU 2 returns to step S104. In step S109, the ECU 2 stops dispensing communication.

Regarding the fuel cell vehicle 100 in END1 in FIG. 2, the following states are assumed. For example, a state is assumed that hydrogen has been dispensed to the fuel cell vehicle 100 at the hydrogen station 200 to the maximum within the allowable range of the hydrogen tank 8 (dispensing complete), and the fuel lid 14 has been closed. Further, a state is assumed that although hydrogen has not been dispensed to the maximum within the allowable range of the hydrogen tank 8, dispensing hydrogen has been stopped and the fuel lid 14 has been closed when a predetermined amount of hydrogen has been dispensed. Still further, a state is assumed that although the fuel lid 14 had been once opened, hydrogen was not dispensed and the fuel lid 14 was closed in a predetermined time period $t_0$.

Accordingly, END1 in FIG. 2 represents a case that the process is terminated without a detection of abnormality of the ECU 2 (the abnormality that the fuel lid 14 is in a state of being left open longer than the predetermined time period $t_0$.)

On the other hand, for the fuel cell vehicle 100 in END2 in FIG. 2, the following states are assumed. For example, a state is assumed that the fuel cell vehicle 100 is left at a place (for example, in a parking area) other than the hydrogen station 200 while the fuel lid 14 is left open by some mistake. Further, a state is supposed that the fuel lid 14 itself is, for example, in troubled or frozen, and, for example, even when a driver tries to close the fuel lid 14, the fuel lid 14 does not completely close, and the fuel lid 14 is thereby actually left open. Still further, a state is assumed that in providing the fuel cell vehicle 100 with hydrogen at the hydrogen station 200, as a failure in communication with the dispenser 22 has occurred, hydrogen is not supplied even if the hydrogen dispensing nozzle 23 is inserted, and a certain time has elapsed in this situation unchanged.

Thus, END2 in FIG. 2 is a case that the ECU 2 has detected abnormality, notifies the driver of the abnormality by blinking the warning lamp (not shown) to terminate the process.

In a case of END2 and when the driver becomes aware, by blinking of the warning lamp (not shown), that the fuel lid 14 is left in the open state longer than the predetermined time period $t_0$ and the driver again wants to perform dispensing of hydrogen, the following steps can be taken.

For example, the drive turns the IG 10, which is in OFF state at END2, once into ON state, and then turns the IG 10 into OFF state. In this case, the process by the ECU 2 returns to step S102 in FIG. 2. Otherwise, for example, the driver once closes the fuel lid 14, which is in the open state at END2, and then opens the fuel lid 14. In this case, the process by the ECU 2 returns to step S103 in FIG. 2.

Advantage in First Embodiment

Regarding the fuel cell vehicle 100 related to the present embodiment, when a state that the fuel lid 14 is open has continued longer than the predetermined time period $t_0$, the ECU 2 (dispensing communication control section 2c) stops dispensing communication. After the dispensing communication has stopped, as power is not consumed by the dispensing communication control section 2c, the charge amount of the battery 4 drops little even when the predetermined time period $t_0$ has elapsed in a state that the fuel lid 14 is open. That is, by not performing dispensing communication longer than necessary, the charge amount (SOC: State Of Charge) of the battery 4 is ensured, making it possible to prevent the battery 4 from running out.

Further, regarding the fuel cell vehicle 100, after stopping dispensing communication, the ECU 2 stops supplying current to the pressure sensor 11 and the temperature sensor 12, and also stops obtaining the hydrogen pressure and the hydrogen temperature inside the hydrogen tank 8. Accordingly, also when the predetermined time period $t_0$ has elapsed in a state that the fuel lid 14 is left open, as the pressure sensor 11, the temperature sensor 12, and the like stops consuming power, the charge amount of the battery 4 drops little. That is, by not performing dispensing communication more than necessary, it is possible to ensure the charge amount (SOC: State Of Charge), and prevent the battery 4 from running out.

Further, regarding the fuel cell vehicle 100, the allowable time period to in performing dispensing communication is set such as to cover most frequencies shown in FIG. 3 (for example, higher than or equal to 99%: refer to the range α). Accordingly, in case that hydrogen is normally dispensed, it is possible to dispense a sufficient amount of hydrogen into the hydrogen tank 8.

Second Embodiment

As the configuration of a fuel cell vehicle 100 in a second embodiment according to the invention is similar to that shown in FIG. 1, description of respective elements of the fuel cell vehicle 100 will be omitted. Further, also in describing the operation of the fuel cell vehicle 100, description of partial operation by processes similar to those described in the first embodiment with reference to FIG. 2 will be briefed or omitted.

The first embodiment and the second embodiment are different in that while a time period $t_0$ for continuously performing dispensing communication is set in advance in the first embodiment, a time period of dispensing communication is decided based on the voltage of the battery 4 at a time the fuel lid 14 is opened in the second embodiment.

Operation of Fuel Cell Vehicle in Second Embodiment

FIG. 4 is a flowchart showing the flow of a process of dispensing communication by the fuel cell vehicle in the second embodiment according to the invention.

As the processes in steps S201 and S202 shown in FIG. 4 are respectively similar to those in steps S101 and S102 shown in FIG. 2, description of these processes will be omitted. In step S202 in FIG. 4, if it is determined that the fuel lid 14 is in the open state (step S202→Yes), the process by an ECU 2 proceeds to step S203. In step S203, the ECU 2 decides a time period of performing dispensing communication (hereinafter, referred to as dispensing communication time period $t_G$), based on the voltage value of the battery 4.

Figure 5A:
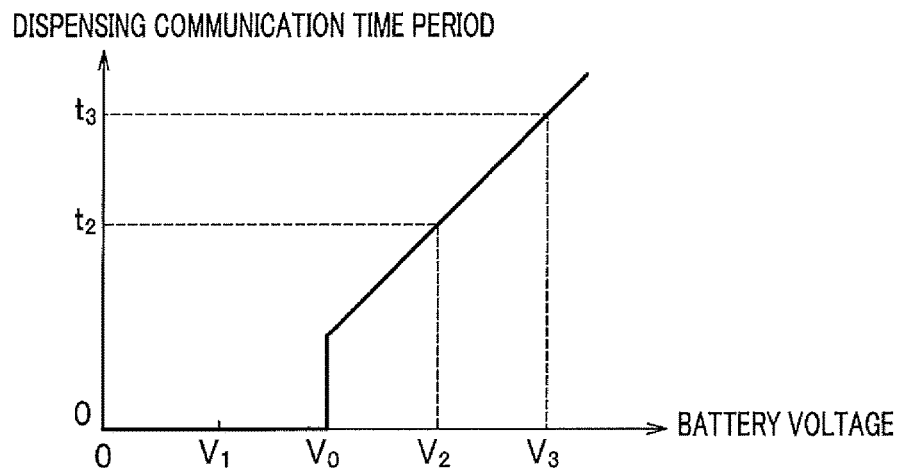
FIG. 5A is a diagram showing the relationship between the battery voltage and the dispensing communication time period of the fuel cell vehicle in the second embodiment according to the invention.

FIG. 5A is a diagram showing the relation between the battery voltage and the dispensing communication time period of the fuel cell vehicle. The horizontal axis in FIG. 5A represents the voltage of the battery 4 at a time the fuel lid 14 is opened (in other words, a time the ECU 2 receives an opening signal from the fuel lid open/close sensor 16). The vertical axis represents the dispensing communication time period $t_G$ corresponding to the voltage of the battery 4. As shown in FIG. 5A, dispensing communication is performed if the voltage of the battery 4 at a time the fuel lid 14 is opened is higher than or equal to a predetermined voltage $V_0$ (for example, $V_2$, $V_3$), and dispensing communication is not performed if the voltage of the battery 4 is lower than a predetermined voltage $V_0$ (for example, $V_1$). That is, the voltage $V_0$ is a threshold as a determination reference in preventing the battery 4 from running out, and is a value that is set in advance. The voltage $V_0$ is a value higher, by a margin of a predetermined voltage, than a boundary voltage at which the battery 4 runs out or not.

Figure 5B:
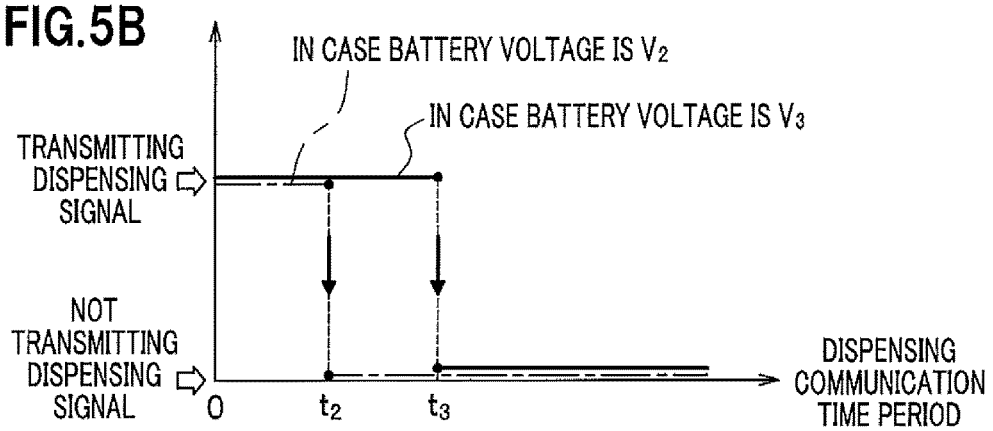
FIG. 5B is a diagram showing ON/OFF states of dispensing communication at respective battery voltages.

FIG. 5B is a diagram showing ON/OFF of dispensing communication at respective battery voltages. The ECU 2 is, as shown in FIG. 5B, performs dispensing communication for a time ($t_2$, $t_3$) that corresponds to the voltage ($V_2$, $V_3$) of the battery 4, the voltage ($V_2$, $V_3$) being at a time the fuel lid 14 is opened. As described above, if the voltage of the battery 4 is $V_1$ (refer to FIG. 5A), the ECU 2 does not perform dispensing communication.

Figure 5C:
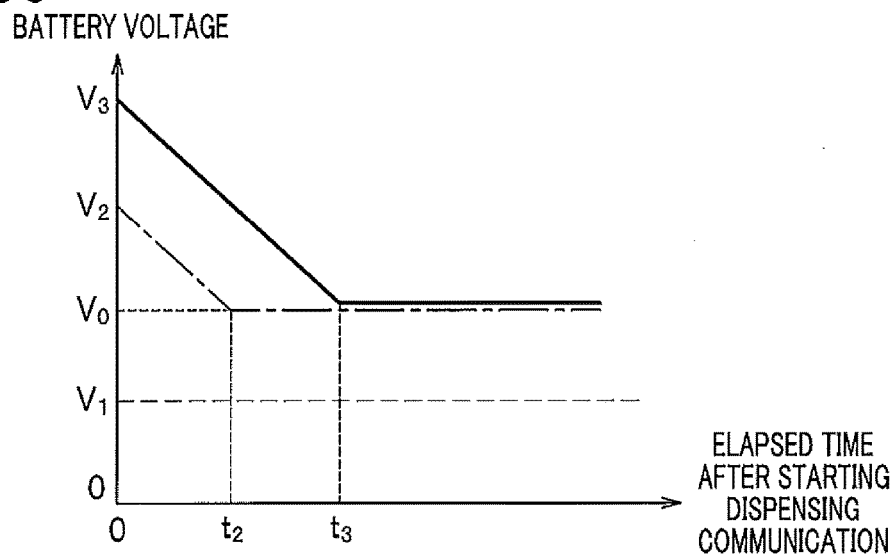
FIG. 5C is a diagram showing the variation in the battery voltages with respect to the elapsed time after a start of dispensing communication.

FIG. 5C is a diagram showing the variation in the battery voltage with respect to the elapse time after a start of dispensing communication. The graph of the solid line shown in FIG. 5C represents a case that the voltage of the battery 4 at a time the fuel lid 14 is opened is $V_3$. Similarly, the graph of alternate long and short dashed line represents the case that the voltage of the battery 4 at a time the fuel lid 14 is opened is $V_2$, and the graph of dashed line represents the case that the voltage of the battery 4 is $V_1$.

As shown in FIG. 5C, the voltage of the battery 4 drops as time elapses after a start of dispensing communication, and drops down to the above-described threshold voltage $V_0$ in a predetermined time period ($t_2$, $t_3$). The higher the voltage ($V_2 < V_3$) of the battery 4 at a time the fuel lid 14 is opened is, the longer the elapse time ($t_2 < t_3$) until the voltage reaches the threshold voltage $V_0$ is.

Accordingly, as shown in FIGS. 5A and 5B, a setting is made in advance in the ECU 2 such that the higher the voltage ($V_2 < V_3$) of the battery 4 at a time the fuel lid 14 is opened is, the longer the dispensing communication time period $t_G$ ($t_2 < t_3$) is. Such information has been experimentally obtained in advance and stored in the storage section, not shown, of the ECU 2. Upon reception of an opening signal from the fuel lid open/close sensor 16, the ECU 2 decides a dispensing communication time period $t_G$, as described above, based on the information stored in the above-described storage section and shown in FIG. 5A.

Returning to FIG. 4, in step S204, the ECU 2 starts dispensing communication. Then, in step S205, the ECU 2 determines whether or not the dispensing communication time period $t_G$ has elapsed after the start of dispensing communication. If the dispensing communication time period $t_G$ has elapsed after the start of dispensing communication (step S205→Yes), the process by the ECU 2 proceeds to step S206. If the dispensing communication time period $t_G$ has not elapsed after the start of dispensing communication (step S205→No), the process by the ECU 2 proceeds to step S209.

As the process in S206 to S210 shown in FIG. 4 is similar to the process in S105 to S109 shown in FIG. 2, description of the process in S206 to S210 will be omitted.

Advantage in Second Embodiment

Regarding the fuel cell vehicle 100 in the present embodiment, the voltage of the battery 4 at a time the fuel lid 14 is opened is detected, and a time period (the dispensing communication time period $t_G$) of performing dispensing communication is decided, based on the voltage. The higher the above-described voltage of the battery 4 is, the longer the dispensing communication time period $t_G$ is set, and a predetermined threshold voltage $V_0$ is ensured as the voltage of the battery 4 at a time the dispensing communication time period $t_G$ has elapsed. That is, regarding the fuel cell vehicle 100, it is possible to dispense hydrogen for a maximum time period allowed corresponding to the voltage of the battery 4 at a time the fuel lid 14 is opened. Further, by not performing dispensing communication longer than necessary, it is possible to ensure the charge amount (SOC: State Of Charge) of the battery 4.

Third Embodiment

As the configuration of a fuel cell vehicle 100 in a third embodiment according to the invention is similar to that shown in FIG. 1, description of respective elements of the fuel cell vehicle 100 will be omitted.

In addition to the feature, of the second embodiment, that a dispensing communication time period $t_G$ is computed based on the voltage of the battery 4 at a time the fuel lid 14 is opened, the present embodiment has a feature that a process of extending a dispensing communication time period is performed in a certain case. Accordingly, regarding the operation of the fuel cell vehicle 100 in the present embodiment, description of a part of performing similar processes as those in the second embodiment will be omitted.

Operation of Fuel Cell Vehicle in Third Embodiment

Figure 6:
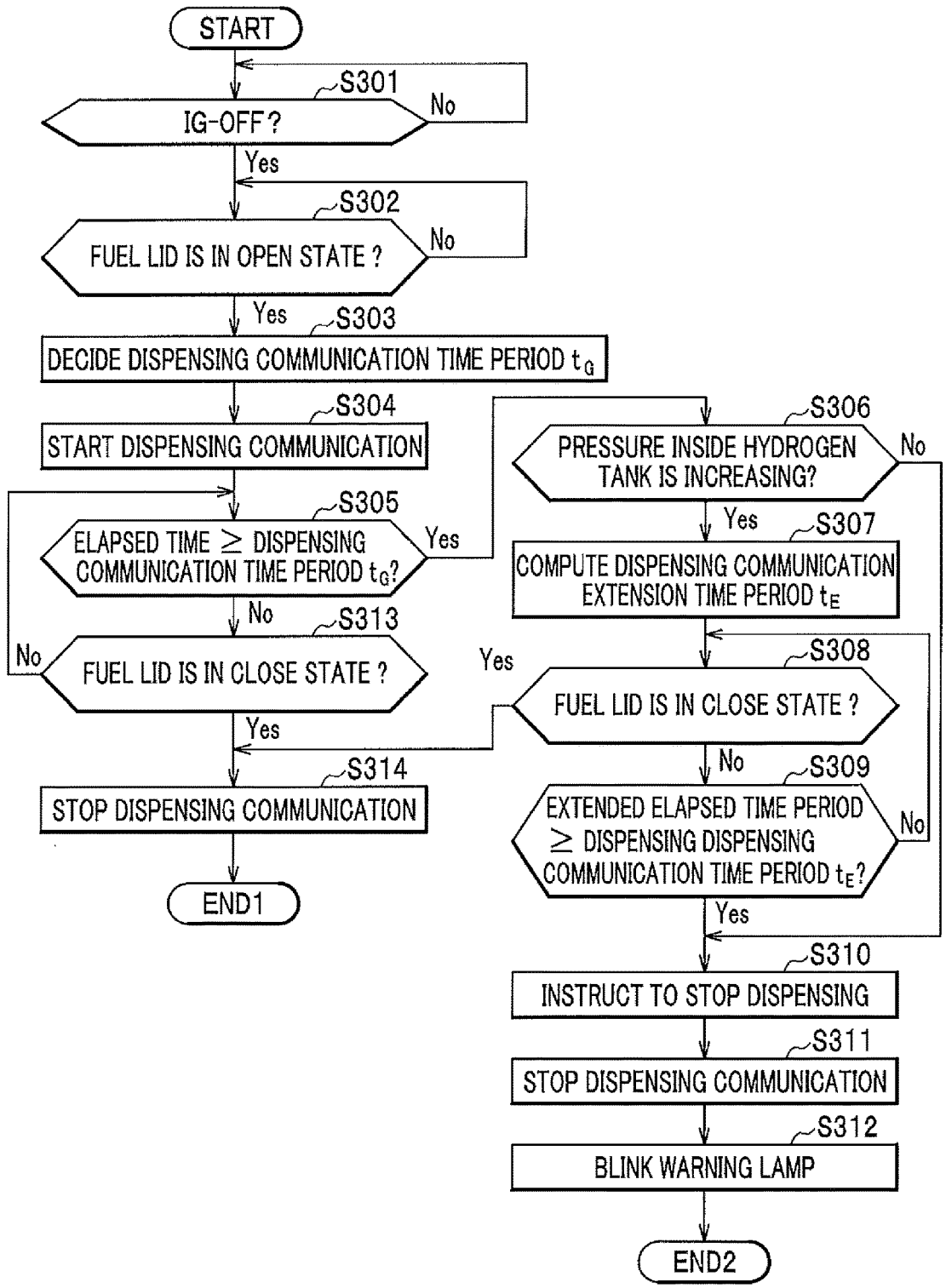
FIG. 6 is a flowchart showing the flow of a process of dispensing communication by the fuel cell vehicle in a third embodiment according to the invention.

FIG. 6 is a flowchart showing the flow of the process of dispensing communication by a fuel cell vehicle in a third embodiment according to the invention.

As the process in S301 to S305 shown in FIG. 6 is similar to the process in S201 to S205 shown in FIG. 4, description of the process in S301 to S305 will be omitted. In step S305 in FIG. 6, if a dispensing communication time period $t_G$, described above by the use of FIG. 5, has elapsed after a start of dispensing communication (step S305→Yes), the process by the ECU 2 proceeds to step S306. In step S306, the ECU 2 determines whether or not the hydrogen pressure inside the hydrogen tank 8 is currently increasing. This determination can be made, for example, depending on whether or not the hydrogen pressure inside the hydrogen tank 8 has increased by a pressure higher than or equal to 0.5 MPa in 10 sec counted from the time (reference time) when the dispensing communication time period $t_G$ has elapsed after the start of dispensing communication.

Herein, for example, the determination in step S306 may be made depending on whether or not the hydrogen pressure inside the hydrogen tank 8 has increased by a pressure higher than or equal to 5 MPa in past 3 min counted from the time (as reference time point) when the dispensing communication time period $t_G$ has elapsed after a start of dispensing communication. That is, in this case, the ECU 2 determines whether or not a history of an increase in the hydrogen pressure inside the hydrogen tank 8 in the past exists.

If the hydrogen pressure inside the hydrogen tank 8 is currently increasing (step S306→Yes), the process by the ECU 2 proceeds to step S307. On the other hand, if the hydrogen pressure inside the hydrogen tank 8 is not currently increasing (step S306→No), the process by the ECU 2 proceeds to step S310.

In step S307, the ECU 2 computes a dispensing communication extension time period $t_E$, based on the increasing rate of the hydrogen pressure of the hydrogen gas dispensed in the hydrogen tank 8. Herein, the dispensing communication extension time period $t_E$ refers to a time period for further performing dispensing communication, the time period being counted from the time (as reference time point) when the dispensing communication time period $t_G$ computed in step S303 has elapsed after the start of dispensing communication.

Figure 7A:
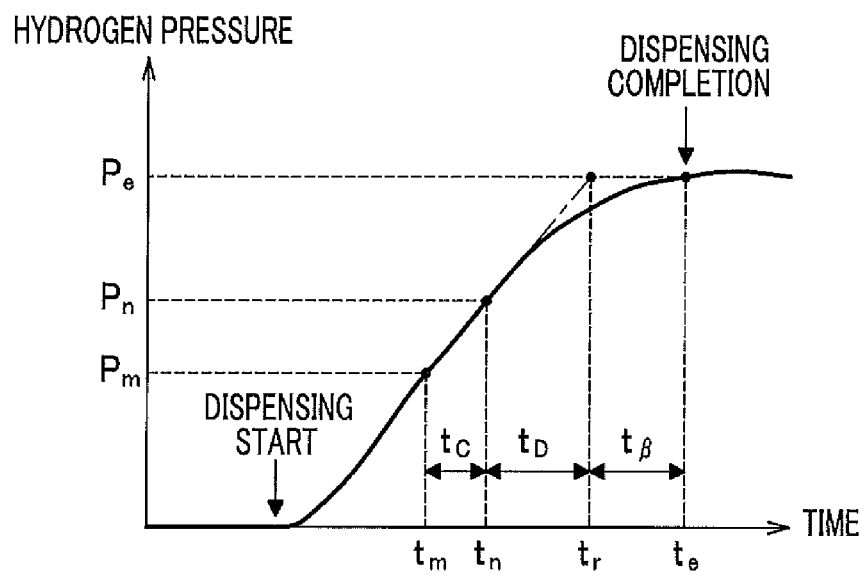
FIG. 7A is a diagram showing the pressure variation in a hydrogen tank with respect to the dispensing time period of hydrogen into the hydrogen tank of the fuel cell vehicle.

FIG. 7A is a diagram showing the pressure variation in the hydrogen tank with respect to the dispensing time period of hydrogen into the hydrogen tank of the fuel cell vehicle. FIG. 7A shows data in a case that hydrogen dispensing has been normally performed from an empty state of the hydrogen tank 8.

The ECU 2 computes a dispensing communication extension time period $t_E$ [min], using Expression 3 described below. In Expression 3, $P_e$ [MPa] represents the hydrogen pressure inside the hydrogen tank 8 at a time of completion of dispensing, wherein this hydrogen pressure is experimentally obtained in advance and stored in the storage section, not shown, of the ECU 2. $P_n$ [MPa] represents the hydrogen pressure inside the hydrogen tank 8 at the current moment (in other words, at the time the ECU 2 obtains information from the pressure sensor 11), while $P_m$ [MPa] represents the hydrogen pressure inside the hydrogen tank 8 at a time that is earlier than the current moment by a predetermined time period $t_C$, wherein $t_\alpha$ [min] (not shown) represents a predetermined margin of time period.

The predetermined time period $t_C$ is a value that is set in advance and can be set, for example, to 1 min. The margin of time period $t_\alpha$ also is a value that is set in advance and can be set, for example, to 3 min.

$$t_E = t_C(P_e - P_n)/(P_n - P_m) + t_\alpha \qquad \text{Expression 3}$$

In FIG. 7A, in case that the pressure at the current time $t_n$ is $P_n$, and the pressure at the time $t_m$ that is earlier than the time $t_n$ by the predetermined time period $t_c$ is $P_m$, the value of $t_C (P_e - P_n)/(P_n - P_m)$ in above Expression 3 is equal to the time period $t_D$ shown in FIG. 7A. That is, it takes the time period $t_\beta$ more to complete dispensing.

The larger the gradient of a graph at the current time $t_n$ shown in FIG. 7A is, the larger the value of the above $t_\beta$ is. Accordingly, the margin of time period $t_\alpha$ in Expression 3 can be set to the value of the time period $t_\beta$ that is taken when the current time $t_n$ is assumed to be the point where the gradient of the graph, shown in FIG. 7A, is at the maximum.

Incidentally, in dispensing hydrogen, it is not always necessary to dispense hydrogen up to the maximum limit (refer to $P_e$ shown in FIG. 7A) of the allowable range of the hydrogen tank 8, and the value of the margin of time period $t_\alpha$ may be appropriately adjusted to be set shorter than a value computed by the above-described method. Further, the dispensing communication extension time period $t_E$ may be set to the value of the predetermined time period $t_0$ described with reference to FIG. 3 in the first embodiment.

In the present embodiment, dispensing communication is performed at longest for 'dispensing communication time period $t_G$+dispensing communication extension time period $t_E$'. In consideration of this point, the dispensing communication time period $t_G$ computed in step S303 is preferably set to be shorter by a predetermined time period in advance.

Returning to FIG. 6, in step S308, the ECU 2 determines whether or not the fuel lid 14 is in the close state. If the fuel lid 14 is in the close state (step S308→Yes), the process by the ECU 2 proceeds to step S314. On the other hand, if the fuel lid 14 is in the open state (step S308→No), the process by the ECU 2 proceeds to step S309. In step S309, the ECU 2 determines whether or not the extended elapsed time period is longer than or equal to the dispensing communication extension time period $t_E$. Herein, 'the extended elapsed time period' is counted from the reference time point (time zero) when the dispensing communication time period $t_G$ computed in step S303 has elapsed after a start of dispensing communication. Then, if the extended elapsed time period is longer than or equal to the dispensing communication extension time period $t_E$ (step S309→Yes), the process by the ECU 2 proceeds to step S310. On the other hand, if the extended elapsed time period is shorter than the dispensing communication extension time period $t_E$ (step S309→No), the process by the ECU 2 returns to step S308.

Description of the process in steps S310 to S314 will be omitted because this process is similar to the process in steps S206 to S210 shown in FIG. 4.

In the above description, in step S306 in FIG. 6, it is determined whether or not the hydrogen pressure inside the hydrogen tank 8 is currently increasing, however, it may be determined whether or not the hydrogen temperature is increasing. This is possible, for example, by determining whether or not the hydrogen temperature inside the hydrogen tank 8 has increased by 1° C. or higher during 10 sec counted from the time (as reference time point) when the dispensing communication time period $t_G$ has elapsed after the start of dispensing communication.

Otherwise, for example, the ECU 2 may make determination in step S306, depending on whether or not the hydrogen temperature in the hydrogen tank 8 has increased by 10° C. or higher during the past 3 min counted from the time (as reference time point) when the dispensing communication time period $t_G$ has elapsed after a start of dispensing communication.

As the method of computing the dispensing communication extension time period $t_E$ in step S307 in FIG. 6, in addition to a method of computing based on a hydrogen pressure that is input from the pressure sensor 11 of the hydrogen tank 8, a method of computing based on a hydrogen temperature that is input from the temperature sensor 12 of the hydrogen tank 8 also can be considered.

Figure 7B:
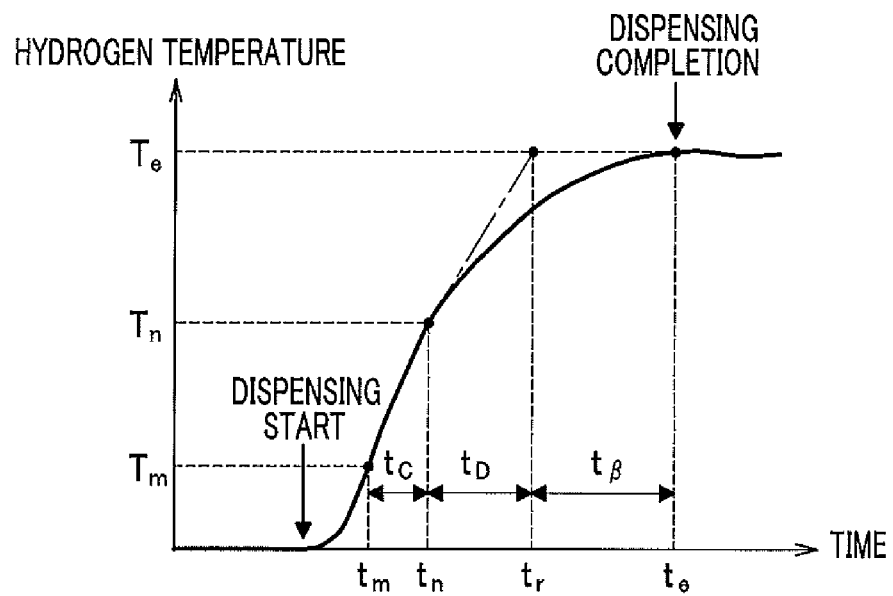
FIG. 7B is a diagram showing the temperature variation of hydrogen gas in the hydrogen tank with respect to the dispensing time period of hydrogen into the hydrogen tank of the fuel cell vehicle.

FIG. 7B is a diagram showing the temperature variation of hydrogen gas in the hydrogen tank with respect to the dispensing time period of hydrogen into the hydrogen tank of the fuel cell vehicle. FIG. 7B shows data in a case that dispensing of hydrogen has been normally performed from an empty state of the hydrogen tank 8.

In case of using the hydrogen temperature in the hydrogen tank 8, the dispensing communication extension time period $t_E$ [min] is computed, using Expression 4 described below. In Expression 4, $T_e$ [° C.] represents a hydrogen temperature in the hydrogen tank 8 at a time when dispensing is completed, wherein this hydrogen temperature is experimentally obtained in advance. $T_n$ [° C.] represents a hydrogen temperature in the hydrogen tank 8 at the current time (at the time when the ECU 2 receives a hydrogen temperature from the temperature sensor 12). $T_m$ [° C.] represents the hydrogen temperature in the hydrogen tank 8 at a time that is earlier than the current time by the predetermined time period $t_C$. The time period $t_\alpha$ [min] (not shown) represents a predetermined margin of time period.

The predetermined time period $t_C$ is a predetermined value, and can be set, for example, to 1 min. The margin of time period $t_\alpha$ is also a predetermined value, and can be set, for example, to 3 min.

$$t_E = t_C(T_e - T_n)/(T_n - T_m) + t_\alpha \quad \text{Expression 4}$$

Setting of the margin of time period $t_\alpha$ and the like are similar to the above, and description will be omitted.

Advantage in Third Embodiment

Regarding the fuel cell vehicle 100 in the present embodiment, in case that a predetermined dispensing communication time period has elapsed while the fuel lid 14 remains in the open state, for example, in a case that hydrogen is currently being supplied at the hydrogen station 200, it is possible to continue to perform dispensing communication with an extension of dispensing communication by a predetermined time period $t_E$. That is, in case that hydrogen is currently being dispensed (or a history of dispensing hydrogen exists), dispensing communication can be continuously performed. Further, by setting the dispensing communication time period $t_G$ in consideration of extending dispensing of hydrogen continuously after the dispensing communication time period $t_G$ has elapsed, it is possible to dispense hydrogen for the maximum limit of time period that is allowed depending on the voltage of the battery 4.

Fourth Embodiment

As the configuration of a fuel cell vehicle 100 in a fourth embodiment according to the invention is similar to that shown in FIG. 1, description of respective elements of the fuel cell vehicle 100 will be omitted. Further, also in describing the operation of the fuel cell vehicle 100, description of partial operation by processes similar to those described in the first embodiment with reference to FIG. 2 will be briefed or omitted.

The fourth embodiment is different from the first embodiment in that, in the fourth embodiment, the ECU 2 (dispensing communication control section 2c) monitors the voltage of the battery 4, and stops dispensing communication if the voltage has become lower than or equal to a predetermined voltage.

Operation of Fuel Cell Vehicle in Fourth Embodiment

FIG. 8 is a flowchart showing the flow of the process of dispensing communication by a fuel cell vehicle in a fourth embodiment according to the invention.

As the processes in steps S401 and S402 shown in FIG. 8 are respectively similar to the processes in steps S101 and S102 shown in FIG. 2, description of these processes will be omitted. In step S402 shown in FIG. 8, if it is determined that the fuel lid 14 is in the open state (step S402 Yes), the process by the ECU 2 proceeds to step S403. In step S403, the ECU 2 starts dispensing communication. In step S404, the ECU 2 determines whether or not the voltage of the battery 4 is lower than or equal to a predetermined voltage $V_0$.

Figure 9A:
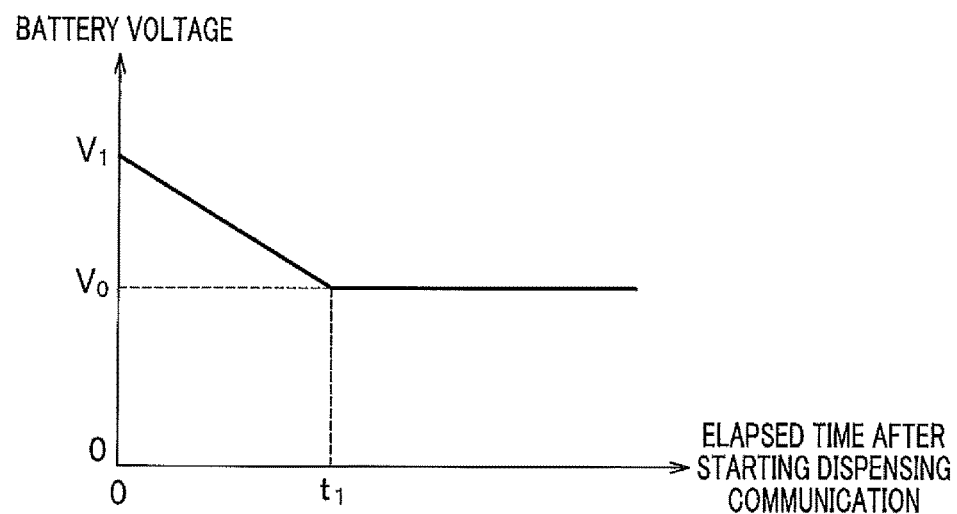
FIG. 9A is a diagram showing the variation in the battery voltage with respect to the elapsed time after a start of dispensing communication regarding the fuel cell vehicle in the fourth embodiment according to the invention.

FIG. 9A is a diagram showing the variation in the battery voltage with respect to the elapsed time from a start of dispensing communication regarding the fuel cell vehicle in the fourth embodiment according to the invention. As shown in FIG. 9A, the voltage of the battery 4 at the time (t=0) when the fuel lid 14 is opened is a voltage represented by $V_1$. As time elapses after the start of dispensing communication by the ECU 2, the voltage of the battery 4 gradually drops. The ECU 2 monitors the voltage of the battery 4 at intervals of a predetermined time period, and the ECU 2 determines whether or not the voltage of the battery 4 becomes lower than or equal to the predetermined voltage $V_0$. That is, the voltage $V_0$ is a threshold as a determination criterion in preventing the battery 4 from running out. Herein, the voltage $V_0$ is set to a value with a margin by a predetermined voltage compared with a voltage on the boundary at which the battery 4 runs out or not.

Figure 9B:
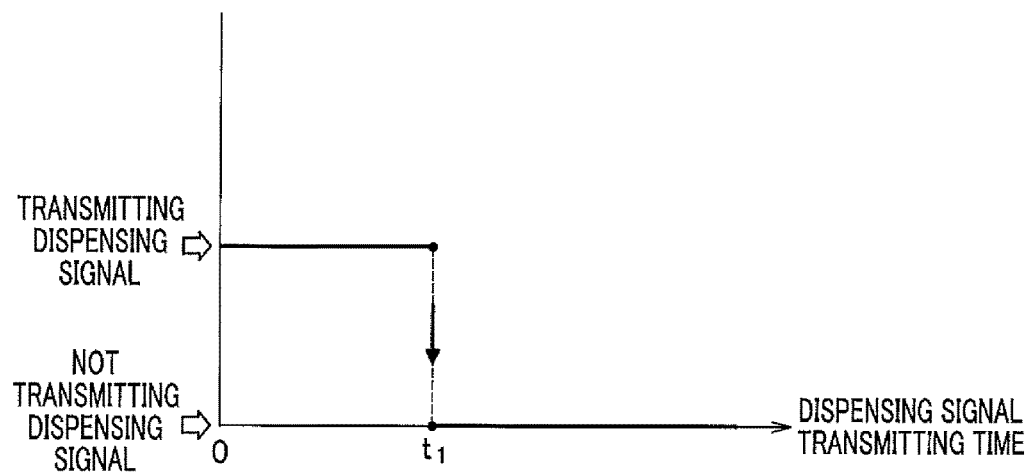
FIG. 9B is a diagram showing ON/OFF states of the dispensing communication at respective battery voltages.

FIG. 9B is a diagram showing ON/OFF of dispensing communication at respective battery voltages. As shown in FIG. 9B, the ECU 2 is set such as to perform dispensing communication up to a time $t_1$ when the voltage of the battery 4 drops down to the predetermined voltage $V_0$ (or lower than $V_0$), and stop dispensing communication thereafter.

Returning to FIG. 8, in step S404, if the voltage of the battery 4 is lower than or equal to the predetermined voltage $V_0$ (step S404→Yes), the process by the ECU 2 proceeds to step S405. The process in steps S405 to S407 shown in FIG. 8 is similar to the process in steps S105 to S107 shown in FIG. 2.

On the other hand, if the voltage of the battery 4 is higher than the predetermined voltage $V_0$ (step S404→No), the process by the ECU 2 proceeds to step S408. In step S408, the ECU 2 determines whether or not a predetermined time period to has elapsed after a start of dispensing communication. The predetermined time period to is similar to that described in the first embodiment with reference to FIG. 3.

If a time longer than or equal to the predetermined time period to has elapsed after the start of dispensing communication (step S408→Yes), the process by the ECU 2 proceeds to step S405. On the other hand, if the predetermined time period $t_0$ has not yet elapsed after the start of dispensing communication (step S408→No), the process by the ECU 2 proceeds to step S409. In step S409, the ECU 2 determines whether or not the fuel lid 14 is in the close state. If the fuel lid 14 is in the close state (step S409→Yes), the ECU 2 stops dispensing communication (step S410). On the other hand, if the fuel lid 14 is in the open state (step S409→No), the process by the ECU 2 returns to step S404.

Advantage in Fourth Embodiment

Regarding the fuel cell vehicle 100 in the present embodiment, the ECU 2 monitors the voltage of the battery 4, and if the voltage of the battery 4 has become lower than or equal to the predetermined voltage $V_0$, the ECU 2 stops dispensing communication regardless of the elapsed time after a start of dispensing communication. Accordingly, a necessary charge amount (SOC: State Of Charge) of the battery 4 can be ensured. Further, even when the charge amount of the battery 4 is higher than the predetermined voltage $V_0$, if the open state of the fuel lid 14 has elapsed for the predetermined time period to or longer, the ECU 2 stops dispensing communication. Accordingly, it is also possible to prevent running out of the battery which could be caused by continuous dispensing communication for a long time.

Fifth Embodiment

As the configuration of a fuel cell vehicle 100 in a fifth embodiment according to the invention is similar to that shown in FIG. 1, description of respective elements of the fuel cell vehicle 100 will be omitted.

In addition to the feature, of the fourth embodiment, that the ECU 2 (dispensing communication control section 2c) monitors the voltage of the battery 4 and the ECU 2 stops dispensing communication if the voltage has become lower than or equal to a predetermined voltage, the present embodiment has a feature that a process of extending a dispensing communication time period is performed in a certain case. Accordingly, regarding the operation of the fuel cell vehicle 100 in the present embodiment, description of a part of performing similar processes as those in the fourth embodiment will be omitted.

Further, regarding extension of the dispensing communication time period, description of points that overlap with the description of the third embodiment will be briefed or omitted.

Operation of Fuel Cell Vehicle in Fifth Embodiment

Figure 10:
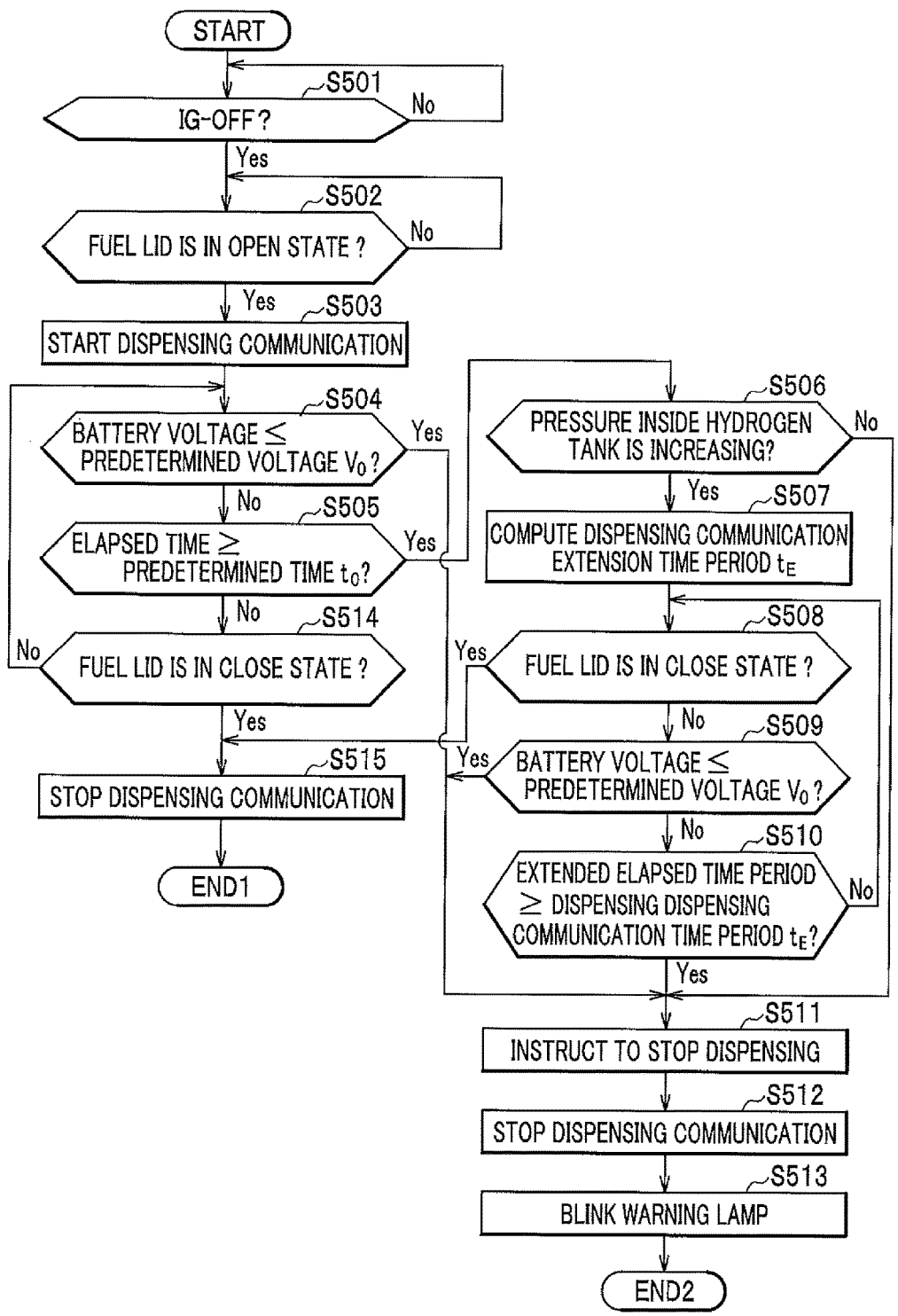
FIG. 10 is a flowchart showing the flow of a process of dispensing communication by the fuel cell vehicle in a fifth embodiment according to the invention.

FIG. 10 is a flowchart showing the flow of the process of dispensing communication by the fuel cell vehicle in a fifth embodiment according to the invention.

As the processes in steps S501 to S503 shown in FIG. 10 are respectively similar to the processes in steps S401 to S403 shown in FIG. 8, description of these processes will be omitted. In step S504 in FIG. 10, the ECU 2 determines whether or not the voltage of the battery 4 is lower than or equal to the predetermined voltage $V_0$. If the voltage of the battery 4 is lower than or equal to the predetermined voltage $V_0$ (step S504→Yes), the process of the ECU 2 proceeds to step S511. On the other hand, if the voltage of the battery 4 is higher than the predetermined voltage $V_0$ (step S504→No), the process of the ECU 2 proceeds to step S505.

In step S505, if the predetermined time period $t_0$ described above with reference to FIG. 3 has elapsed after a start of dispensing communication (step S505→Yes), the process by the ECU 2 proceeds to step S506. On the other hand, if the predetermined time period $t_0$ has not yet elapsed after the start of dispensing communication (step S505→No), the process by the ECU 2 proceeds to step S514.

In step S506, as described above, the ECU 2 determines whether or not the hydrogen pressure (or hydrogen temperature) inside the hydrogen tank 8 is currently increasing. If the hydrogen pressure inside the hydrogen tank 8 is currently increasing (step S506→Yes), the process by the ECU 2 proceeds to step S507. On the other hands, if the hydrogen pressure inside the hydrogen tank 8 is not increasing (step S506→No), the process by the ECU 2 proceeds to step S511.

Then, in step S507, as described above, the ECU 2 computes a dispensing communication extension time period $t_E$. Then, in step S508, the ECU 2 determines whether or not the fuel lid 14 is in the close state. If the fuel lid 14 is in the close state (step S508→Yes), the process by the ECU 2 proceeds to step S515. On the other hand, if the fuel lid 14 is in the open state (step S508→No), the process by the ECU 2 proceeds to step S509.

In step S509, the ECU 2 determines whether or not the voltage of the battery 4 is lower than or equal to the predetermined voltage $V_0$. If the voltage of the battery 4 is lower than or equal to the predetermined voltage $V_0$ (step S509→Yes), the process by the ECU 2 proceeds to step S511. On the other hand, if the voltage of the battery 4 is higher than the predetermined voltage $V_0$ (step S509→No), the process by the ECU 2 proceeds to step S510.

In step S510, the ECU 2 determines whether or not the extended elapsed time described above is longer than or equal to the dispensing communication extension time period $t_E$. If the extended elapsed time is longer than or equal to the dispensing communication extension time period $t_E$ (step S510→Yes), the process by the ECU 2 proceeds to step S511. On the other hand, If the extended elapsed time is shorter than the dispensing communication extension time period $t_E$ (step S510→No), the process by the ECU 2 returns to step S508.

The process in steps S511 to S513 shown in FIG. 10 is similar to the process in steps S405 to S407 shown in FIG. 8. The process in steps S514 and S515 shown in FIG. 10 is similar to the process in steps S409 and S410 shown in FIG. 8.

Advantage in Fifth Embodiment

Regarding the fuel cell vehicle 100 in the present embodiment, even if a predetermined time period has elapsed while the open state of the fuel lid 14 remains, for example, in case that hydrogen is currently being dispensed at the hydrogen station 200, it is possible to continue to perform dispensing communication with an extension by the predetermined time period $t_E$. Accordingly, in case that hydrogen is currently being dispensed (or a history of dispensing hydrogen exists), dispensing communication can be continuously performed.

Further, regarding the fuel cell vehicle 100 in the present embodiment, the ECU 2 monitors the voltage of the battery 4, and if the voltage of the battery 4 has become lower than or equal to the predetermined voltage $V_0$, the ECU 2 stops dispensing communication regardless of the elapsed time after a start of dispensing communication. Accordingly, a necessary charge amount (SOC: State Of Charge) of the battery 4 can be ensured.

Modified Example

Fuel cell vehicles 100 according to the present invention have been concretely described in the respective embodiments, however, the spirit of the invention is not limited thereto, and various changes and modifications can be made.

For example, although the fuel lid opener 15 and the fuel lid open/close sensor 16 shown in FIG. 1 are individually arranged, these may be designed in integration with each other.

Further, for a case that the ECU 2 determines that hydrogen is currently being dispensed (or a history of dispensing hydrogen exists), according to the flowchart shown in FIG. 6 or FIG. 10, it has been described about cases of extending dispensing communication by the dispensing communication extension time period $t_E$, however, the invention is not limited thereto. That is, for example, in the case of the first embodiment (the flowchart in FIG. 2) in which dispensing communication is stopped when the predetermined time period $t_0$ has elapsed after a start of dispensing communication, a process can be added to extend dispensing communication by the dispensing communication extension time period $t_E$ in a certain case as described above.

Further, an example has been described where it is determined whether or not hydrogen is currently being dispensed into the hydrogen tank 8 (refer to step S306 in FIG. 6 and step S506 in FIG. 10), using a hydrogen pressure detected by the pressure sensor 11 (or a hydrogen temperature detected by the temperature sensor 12), however, the invention is not limited thereto. That is, by combination of the increase amount of the hydrogen pressure detected by the pressure sensor 11, and the hydrogen temperature detected by the temperature sensor 12, it may be determined whether or not hydrogen is currently being dispensed into the hydrogen tank 8 (or a history of dispensing exits).

Further, a sensor may be provided to detect that the hydrogen dispensing nozzle 23 has been inserted into the hydrogen dispensing inlet 17 of the fuel cell vehicle 100 shown in FIG. 1. In this case, the ECU 2 can start dispensing communication if the fuel lid 14 is opened and this sensor detects that the hydrogen dispensing nozzle 23 has been inserted into the hydrogen dispensing inlet 17. Still further, when this sensor detects that the hydrogen dispensing nozzle 23 has been removed from the hydrogen dispensing inlet 17, the ECU 2 can immediately stop dispensing communication.

Yet further, although, referring to FIG. 1, a case that the fuel cell vehicle 100 is provided with hydrogen at the hydrogen station 200 has been described, the invention is not limited thereto and can be applied to an apparatus using fuel gas supplied from outside. For example, the invention is applicable to a case of supplying hydrogen from a tanker having a hydrogen tank mounted on it to a hydrogen tank installed in a factory or the like.

Further, in addition to fuel cell vehicles, such as a four-wheel vehicle, a motorbike, and the like, the invention is applicable to various fuel cell mobile bodies (for example, a vessel or a space vessel using fuel gas). The invention is also applicable to a hydrogen vehicle having a hydrogen engine.

Still further, although a case of using hydrogen as fuel gas has been described above, the invention is also applicable to a case of using natural gas or the like as fuel gas.

What is claimed is:

1. An apparatus using fuel gas supplied from an external fuel gas supply device, comprising:
    a battery for supplying power to one or more devices of the apparatus;
    a fuel gas reservoir unit for reserving fuel gas supplied from the fuel gas supply device;
    a fuel lid for covering a supply inlet to which fuel gas is supplied from the fuel gas supply device;
    means for detecting an open state and a close state of the fuel lid;
    means for detecting fuel gas condition that is a pressure and/or a temperature of fuel gas reserved in the fuel gas reservoir unit;
    means for performing communication with the fuel gas supply device; and
    means for, upon reception of a signal notifying that the fuel lid is in an open state from the means for detecting an open state and a closed state, controlling dispensing communication, using power supplied from the battery, in order to notify the condition of the fuel gas having been input from the means for detecting fuel gas condition to the fuel gas supply device via the means for performing communication,
    wherein the means for controlling continues or stops the dispensing communication depending on a determination of whether or not the fuel gas is supplied to the fuel gas reservoir unit based on the signal input from the means for detecting fuel gas condition after the means for controlling has determined, according to a signal received from the means for detecting an open state and a closed state, that a predetermined time period has elapsed with the fuel lid remaining in the open state after starting the dispensing communication,
    the means for controlling computes a dispensing communication extension time period when the means for controlling has determined that fuel gas is supplied to the fuel gas reservoir after the predetermined time period has elapsed with the fuel lid remaining in the open state,
    the means for controlling stops the dispensing communication when the means for controlling has determined, according to the signal received from the means for detecting an open state and a closed state, that the predetermined time period and the dispensing communication extension time period have elapsed with the fuel lid remaining in the open state after starting the dispensing communication, and
    the means for controlling starts the dispensing communication when an ignition switch is turned off after the ignition switch is turned on.

2. The apparatus using fuel gas according to claim 1, wherein the predetermined time is set based on statistical data of a dispensing time, and
    the dispensing communication is stopped after the predetermined time has lapsed regardless of a remaining amount of the battery.

3. The apparatus using fuel gas according to claim 1,
    wherein, the means for controlling continues the dispensing communication for a predetermined extension time period, when, according to a signal having been input from the means for detecting fuel gas condition, the means for controlling has determined that fuel gas is currently being supplied to the fuel gas reservoir unit after a reference time point or that fuel gas was supplied to the fuel gas reservoir unit within a predetermined past time after the reference time point, the reference time point being a time point at which the predetermined time period has elapsed with the fuel lid remaining in the open state after starting the dispensing communication.

4. The apparatus using fuel gas according to claim 1, further comprising a fuel lid opener and a fuel lid opener switch, and the fuel lid opener is driven by an electric signal.

5. The apparatus using fuel gas according to claim 1, wherein a fuel lid opener switch is turned on when the ignition switch is turned on.

* * * * *